March 13, 1962　　　J. I. DAVIS ET AL　　　3,024,858
CONTROL MECHANISM FOR TOWING VEHICLES
Filed March 14, 1960　　　　　　　　　　　　　11 Sheets-Sheet 2
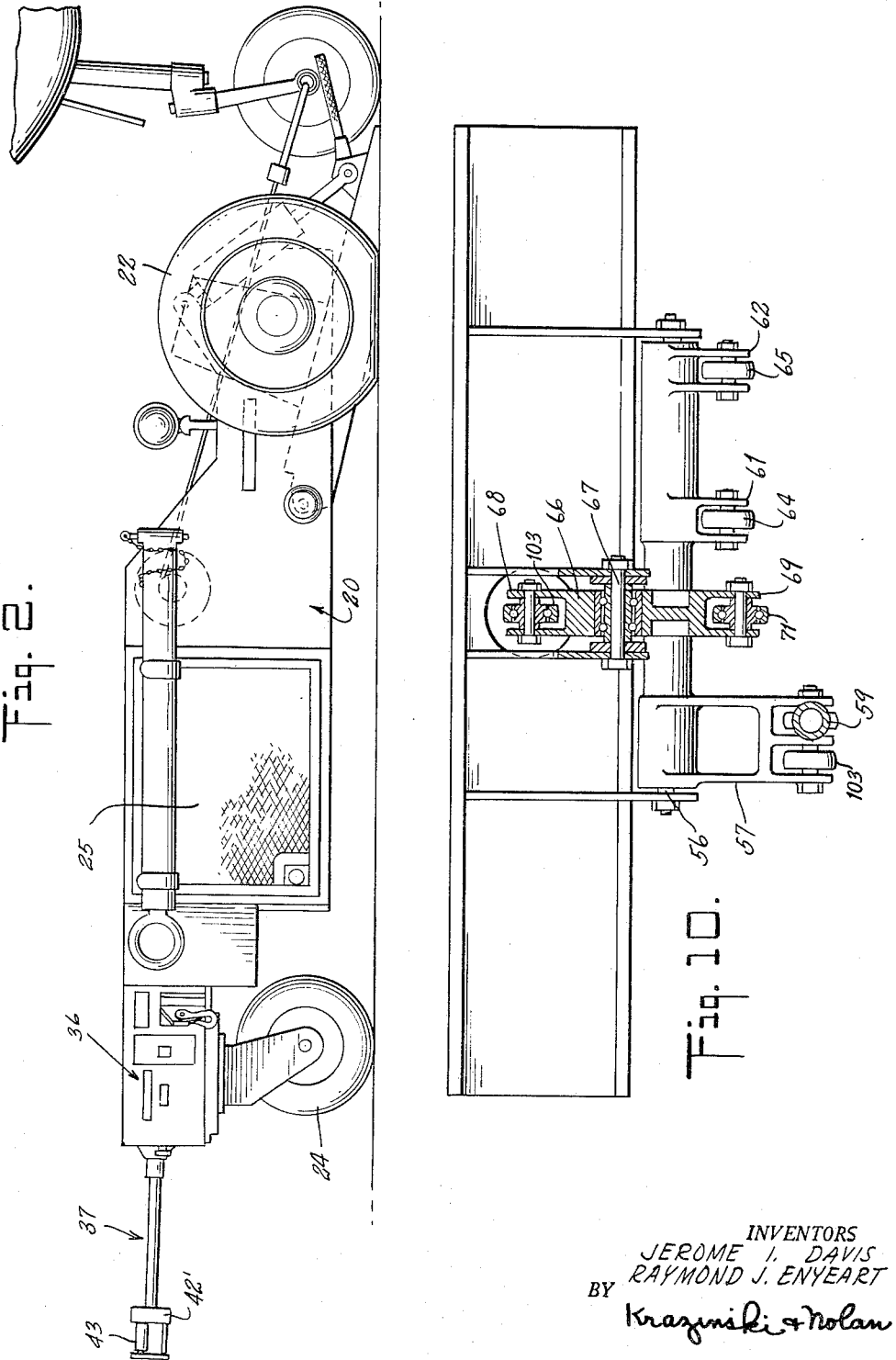
INVENTORS
JEROME I. DAVIS
RAYMOND J. ENYEART
BY
Krazinski + Nolan
ATTORNEYS

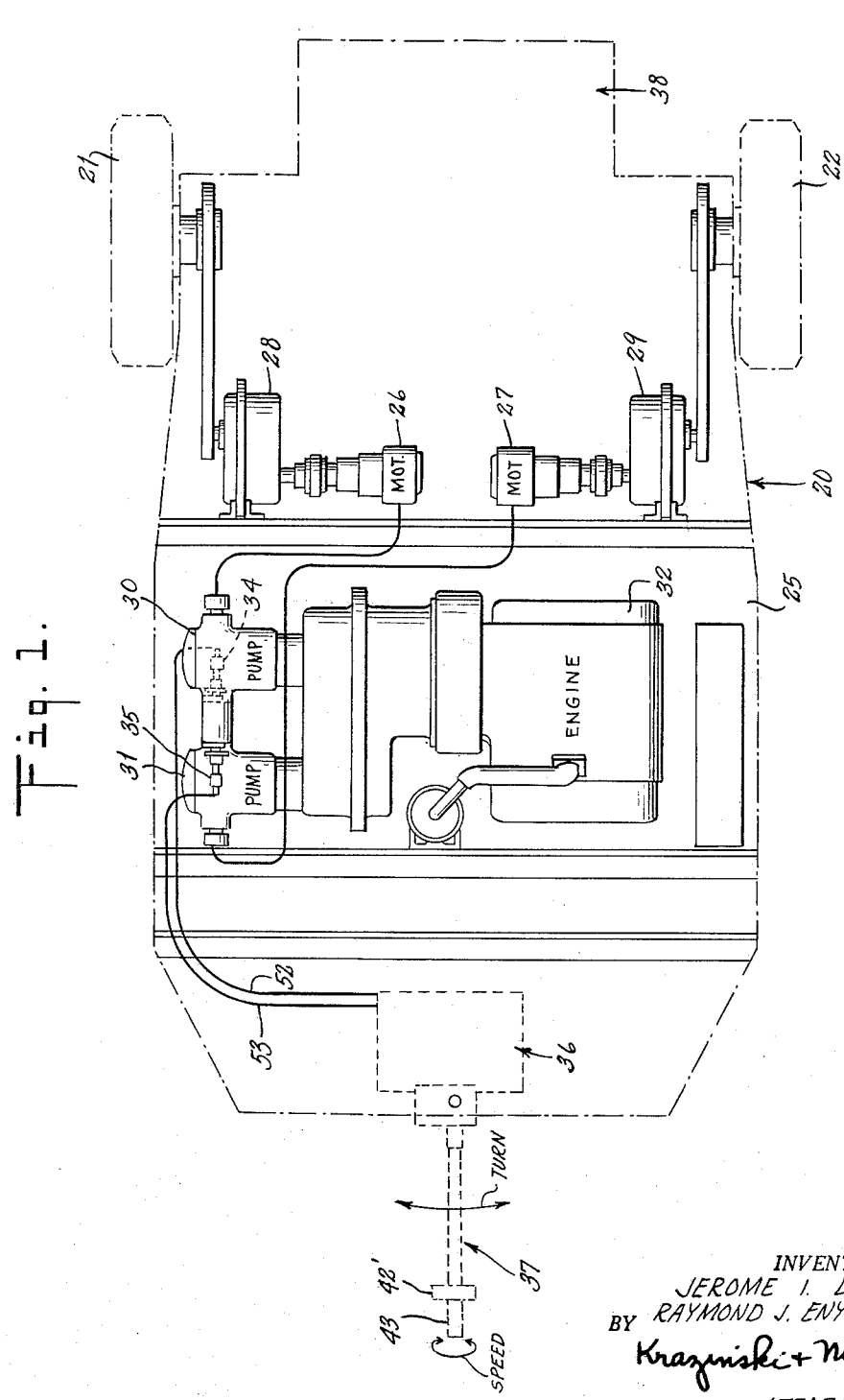

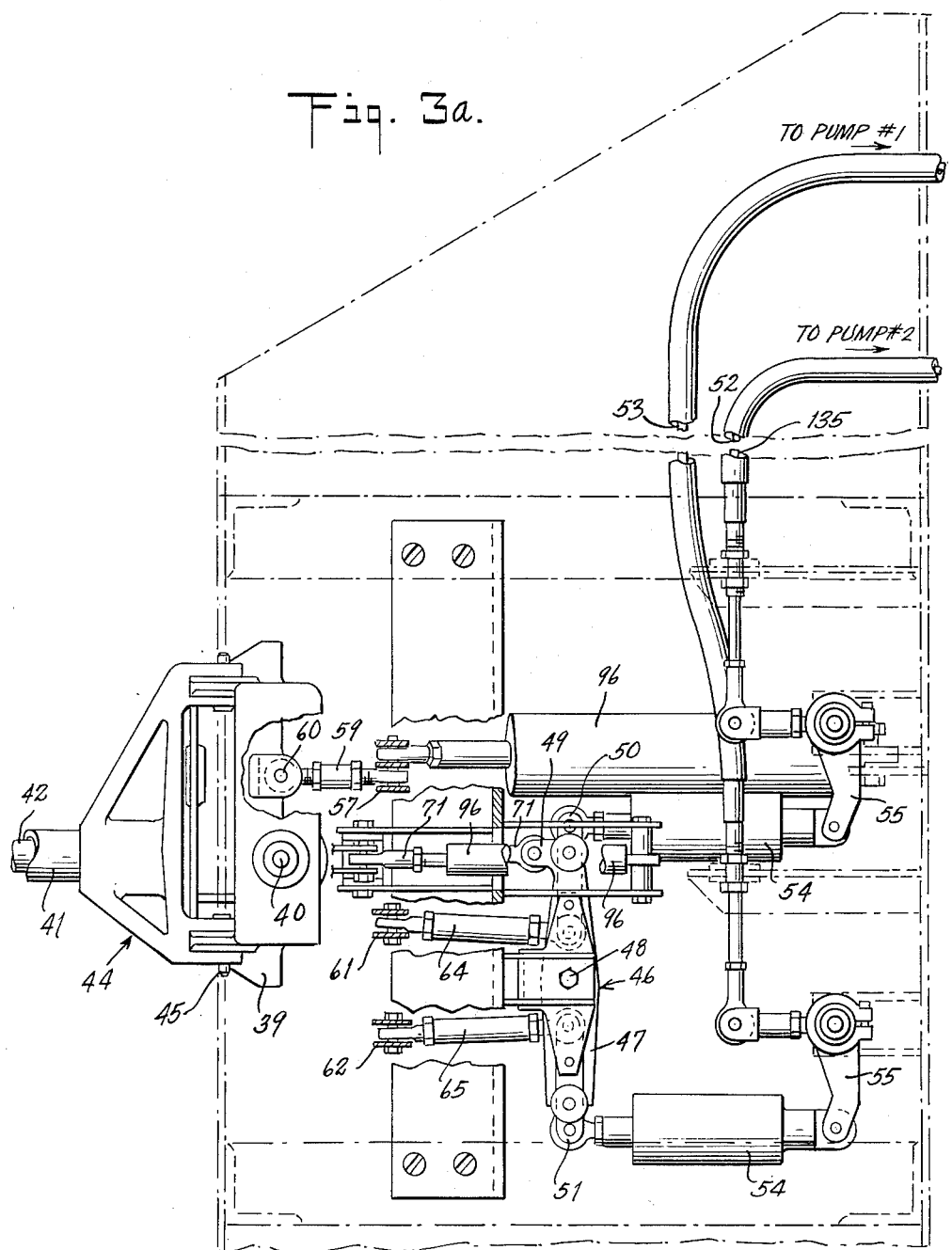

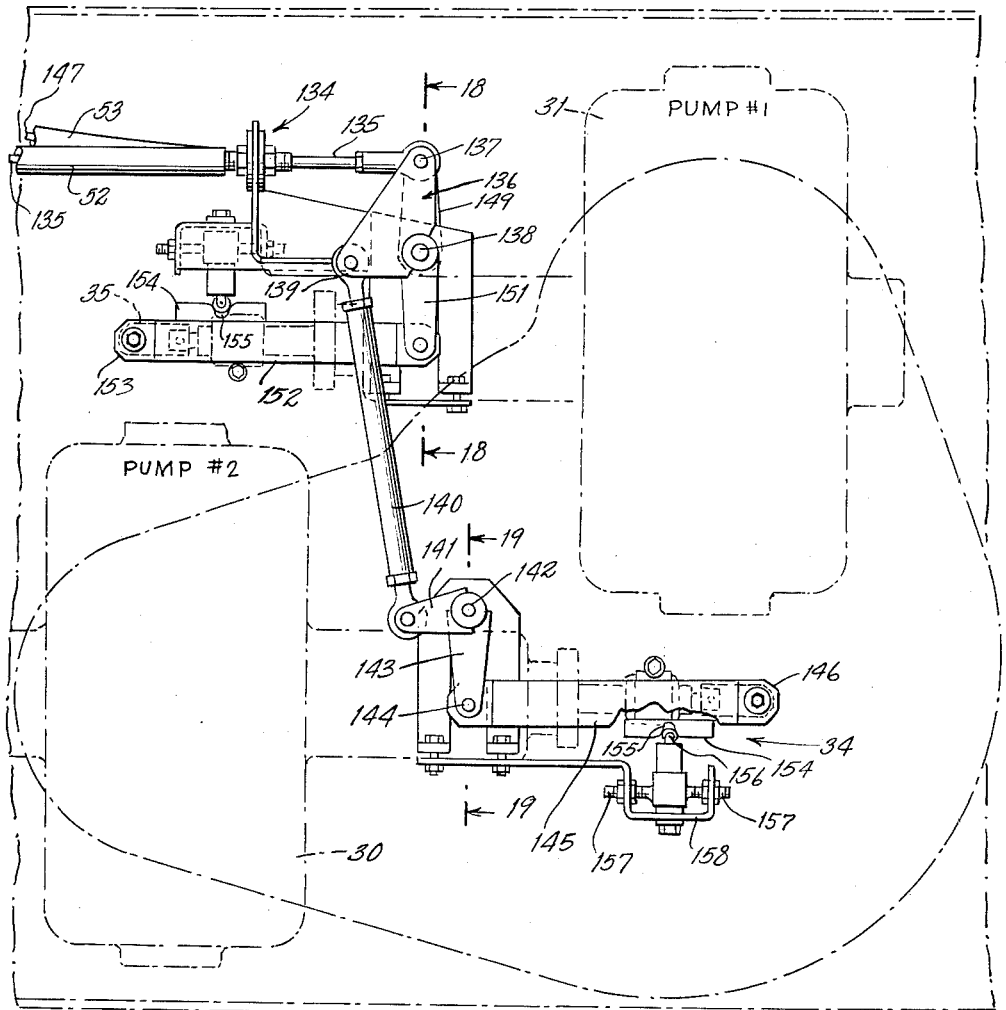

March 13, 1962  J. I. DAVIS ET AL  3,024,858
CONTROL MECHANISM FOR TOWING VEHICLES
Filed March 14, 1960  11 Sheets-Sheet 5

INVENTORS
JEROME I. DAVIS
BY RAYMOND J. ENYEART
Krazinski + Nolan
ATTORNEYS

March 13, 1962 J. I. DAVIS ET AL 3,024,858
CONTROL MECHANISM FOR TOWING VEHICLES
Filed March 14, 1960 11 Sheets-Sheet 6
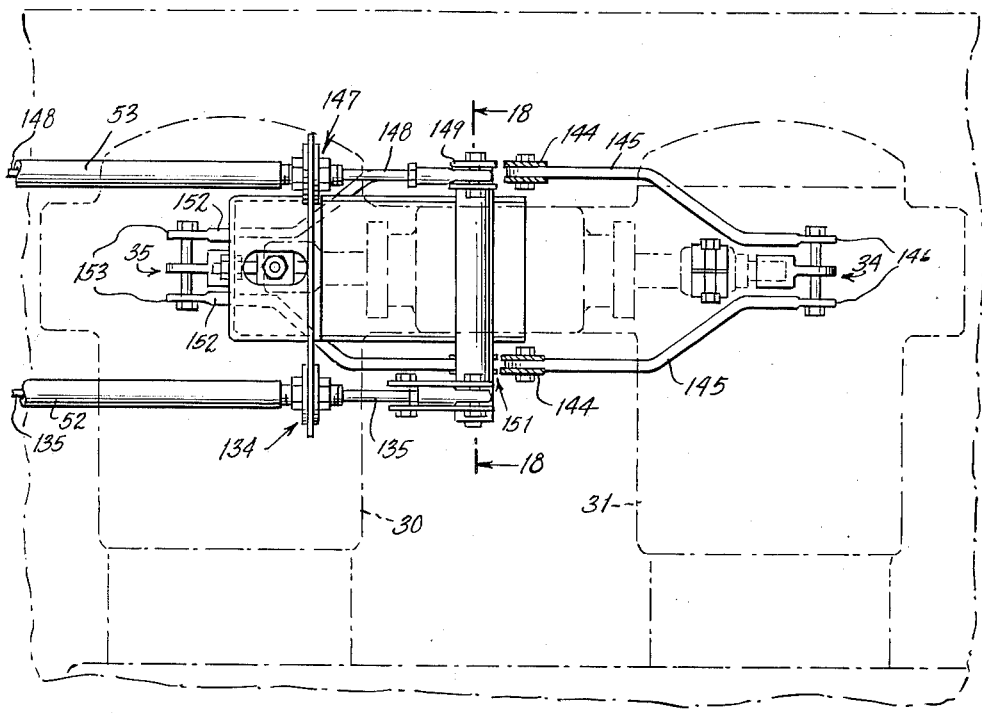
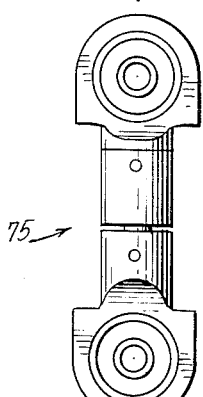
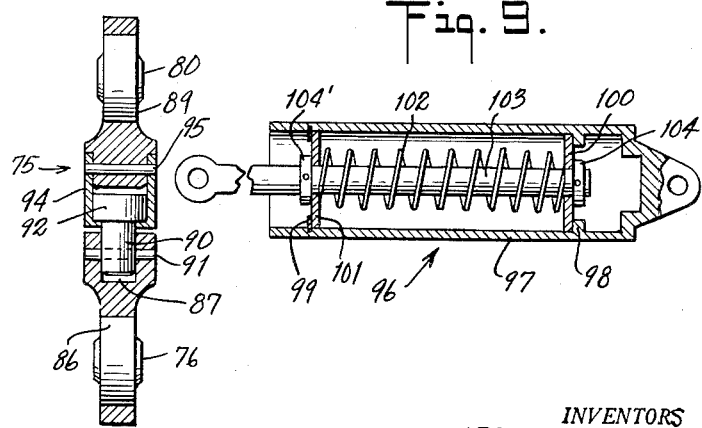
INVENTORS
JEROME I. DAVIS
RAYMOND J. ENYEART
BY
Krazinski + Nolan
ATTORNEYS

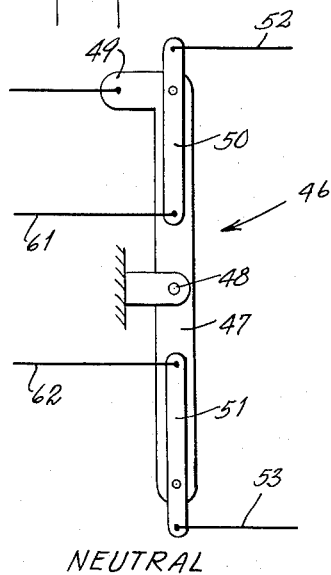
NEUTRAL
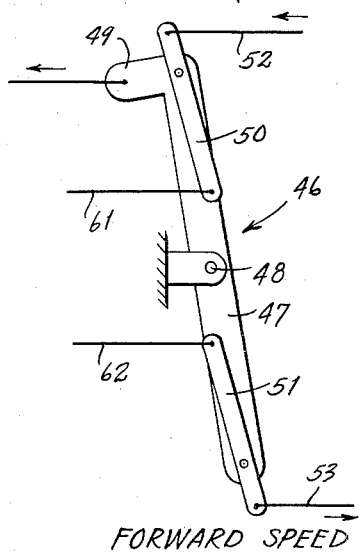
FORWARD SPEED
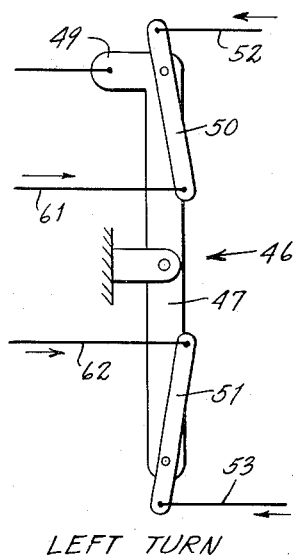
LEFT TURN
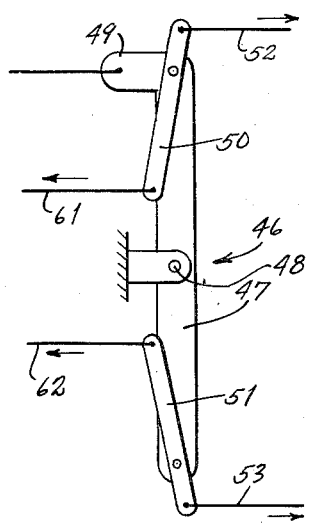
RIGHT TURN March 13, 1962  J. I. DAVIS ET AL  3,024,858
CONTROL MECHANISM FOR TOWING VEHICLES
Filed March 14, 1960  11 Sheets-Sheet 8

REVERSE SPEED

COMPOSITE
(FORWARD SPEED—LEFT TURN)

INVENTORS
JEROME I. DAVIS
RAYMOND J. ENYEART
BY Krazinski & Nolan
ATTORNEYS

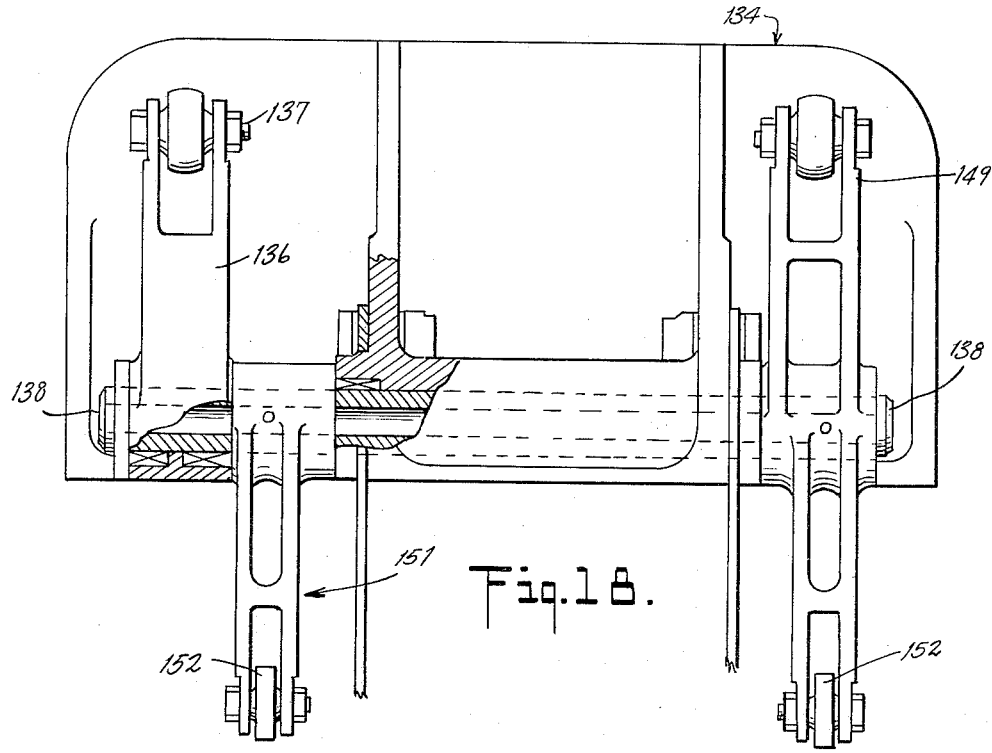
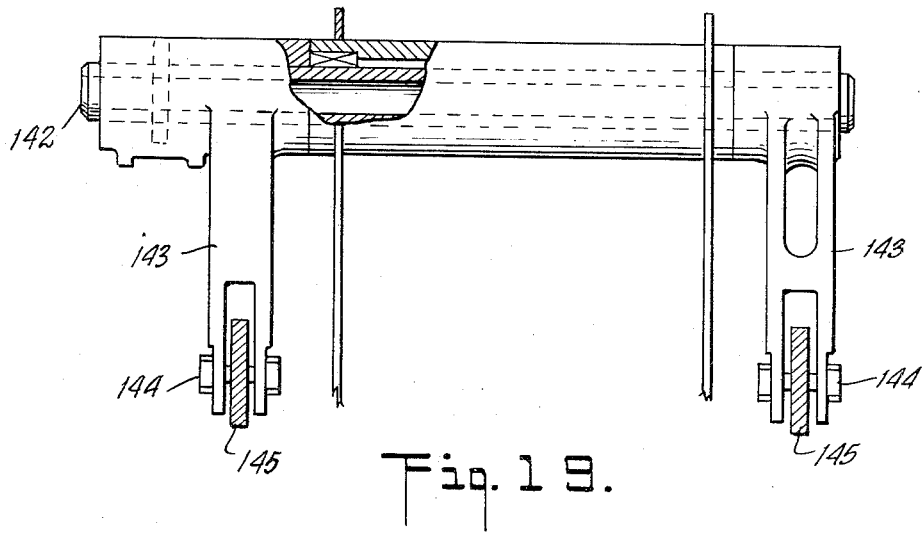

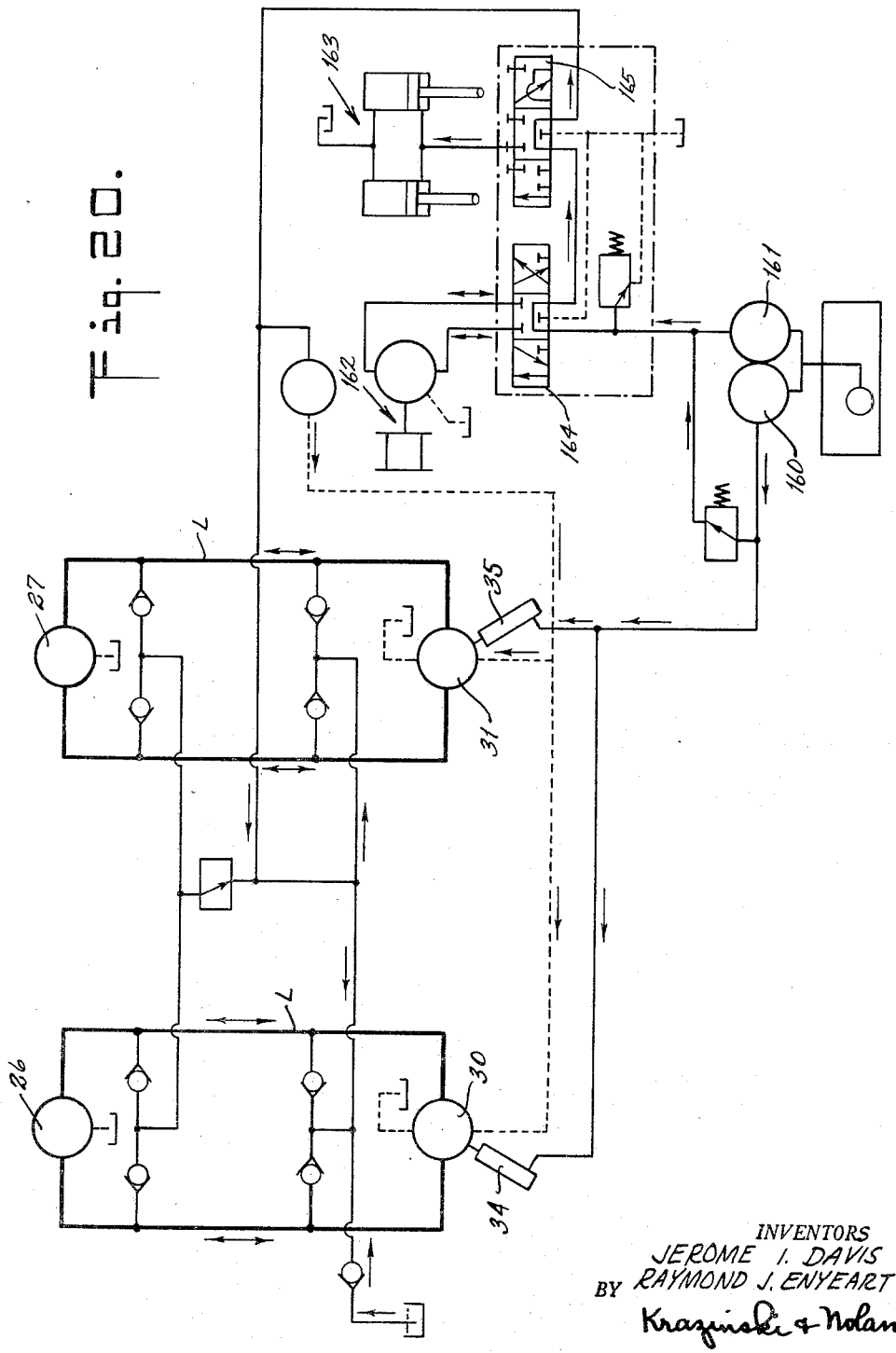

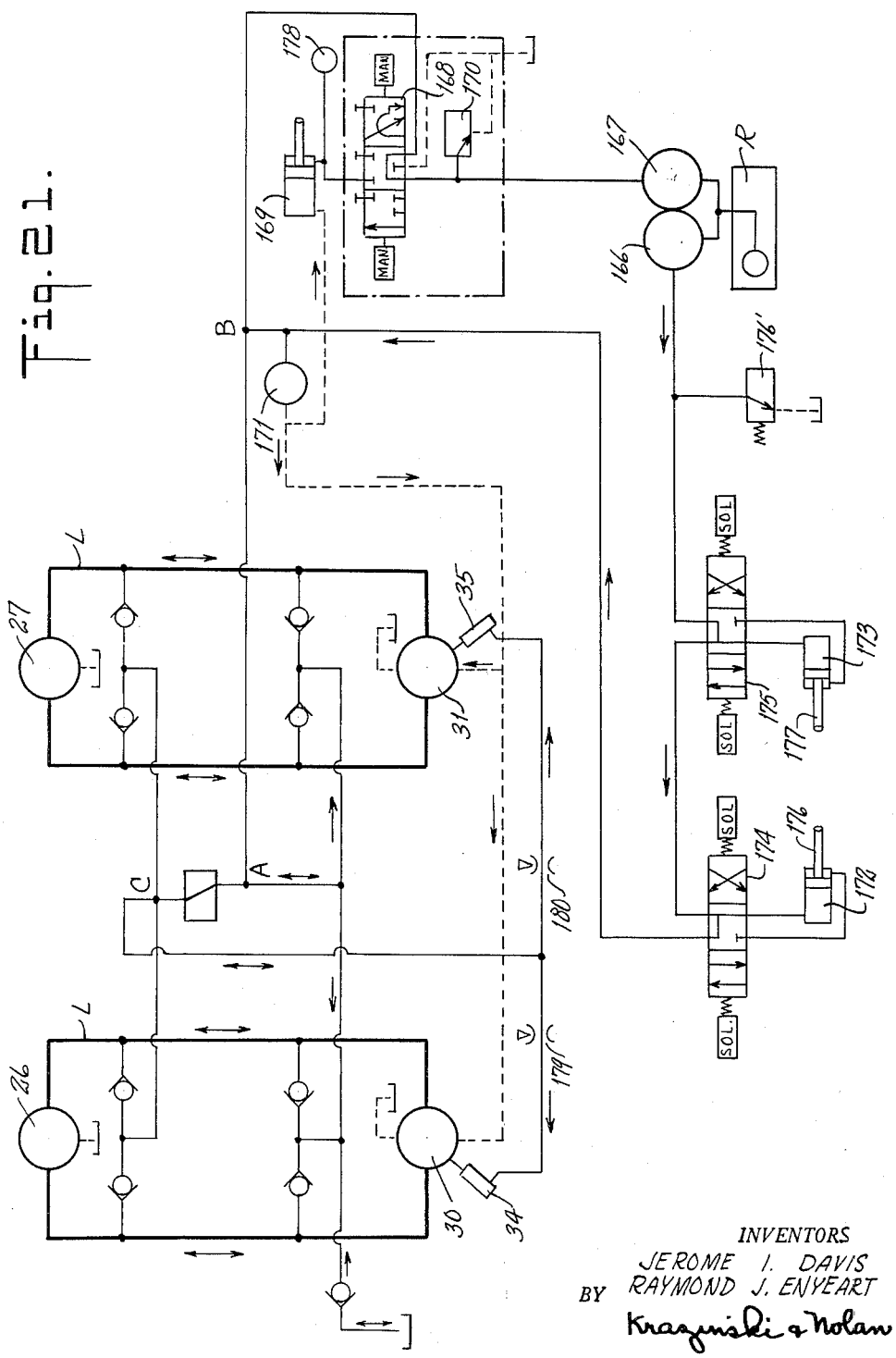

United States Patent Office 3,024,858
Patented Mar. 13, 1962

3,024,858
CONTROL MECHANISM FOR TOWING VEHICLES
Jerome I. Davis, Bedford, N.Y., and Raymond J. Enyeart, Westport, Conn., assignors to Consolidated Diesel Electric Corporation, Stamford, Conn., a corporation of New York
Filed Mar. 14, 1960, Ser. No. 14,573
23 Claims. (Cl. 180—6.48)

The present invention relates to towing vehicles, and more particularly to an improved mechanism for controlling the speed and turning of such vehicles.

The present invention is primarily concerned with towing vehicles adapted for moving aircraft and other wheeled vehicles over relatively short distances without utilizing any power from the engine of the craft or vehicle to be towed, for example, aircraft of the larger type such as the new commercial jet aircraft which is equipped with conventional tricycle landing gear.

Heretofore, it has been proposed to move such aircraft by towing vehicles but difficulties were encountered in maneuvering the aircraft in tight places, and crowded apron areas where sharp turns were required. Such conditions also exist where small aircraft must be moved between storage and the runway aboard naval aircraft carriers.

Accordingly, an object of the present invention is to provide a towing vehicle which is controlled in an improved manner to overcome the prior difficulties and disadvantages.

Another object is to provide such a vehicle which enables aircraft to turn about its own landing gear, thus turning the aircraft about the smallest possible turning radius.

Another object is to provide such a vehicle wherein two driving wheels are driven independently and improved control means are arranged to drive both wheels in the same direction or in opposite directions and at the same or varying speeds.

Another object is to provide such control means which are manually operable and are equipped with means for returning the same to a neutral position if manually released.

A further object is to accomplish the foregoing in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing the vehicle with left and right driving wheels adjacent one end of the vehicle, a caster adjacent the other end of the vehicle, a rotary hydraulic motor for each of the driving wheels, a reversible pump for each of the motors, each pump connected in a closed loop with one of the motors for supplying hydraulic fluid under pressure to the motors, an engine for driving the pumps, servo means at each pump for controlling rate and direction of flow of fluid in the loops, and manually operable control mechanism for operating the servo means including speed control means for simultaneously varying the amount of fluid delivered to both of the motors in either direction to maintain the speed of the motors equal and including turn control means for causing the fluid to flow in the loops to reversibly drive the motors in opposite directions and thereby effect turning of the vehicle.

A preferred embodiment of the invention has been chosen for purposes of illustration and description and is shown in the accompanying drawings, forming a part of the specification, wherein:

FIG. 1 is a plan view of a towing vehicle illustrating the essential components of a power plant and drive for the vehicle.

FIG. 2 is a side elevational view of the vehicle shown in FIG. 1.

FIGS. 3a and 3b are plan views of a system for controlling the power plant and drive of the vehicle.

FIGS. 4a and 4b are side elevational views of the system shown in FIGS. 3a and 3b, respectively.

FIG. 7 is an enlarged side elevational view of a swivel rod assembly shown in FIG. 6.

FIG. 8 is a sectional view taken along the line 8—8 on FIG. 7.

FIG. 9 is a longitudinal sectional view of a spring operated device for returning the speed and steering control mechanism to a neutral position.

FIG. 10 is a view taken along the line 10—10 on FIG. 4a illustrating the linkage for operating the steering control mechanism.

FIG. 12 is a diagrammatic view illustrating the speed and steering control mechanism in its neutral position.

FIGS. 13 and 14 are respective diagrammatic views of the control mechanism in forward and reverse speed controlling positions.

FIGS. 15 and 16 are respective diagrammatic views of the mechanism in left and right turn steering controlling positions.

FIG. 18 is a sectional view taken along lines 18—18 of FIGS. 3b and 4b in the direction of the arrows.

FIG. 19 is a sectional view taken along lines 19—19 of FIG. 4b in the direction of the arrows.

FIGS. 20 and 21 are hydraulic fluid flow diagrams.

Figure 4A:
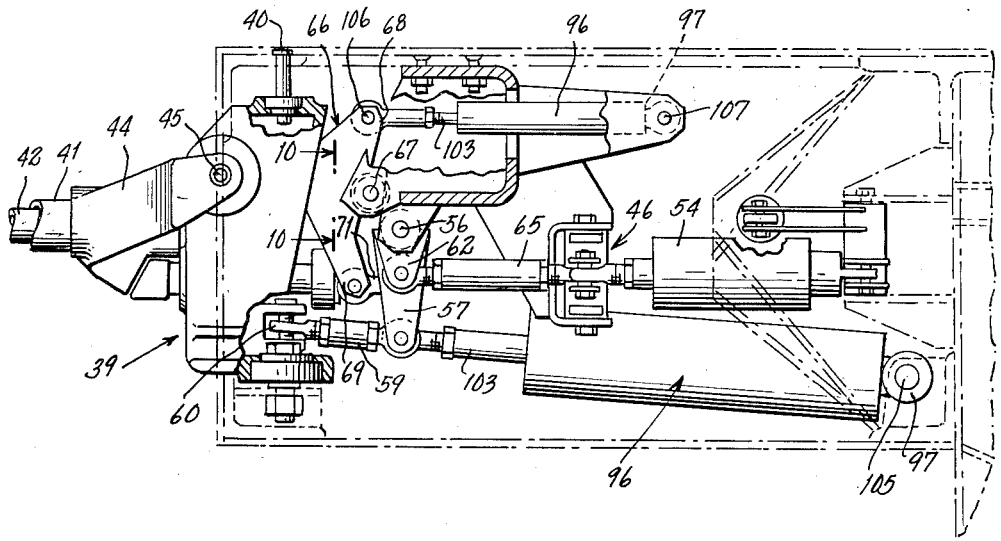

Referring now to FIGS. 1 and 2 of the drawings in detail, a towing vehicle is shown which generally comprises a chassis 20, a right wheel 21 and a left wheel 22 adjacent the rear end of the vehicle for driving the same, a caster wheel 24 adjacent the front of the vehicle, and a body or compartment 25 mounted on the chassis for housing a power plant and the control mechanism therefor including rotary reversible hydraulic motors 26, 27 and transmissions 28, 29 for driving the wheels 21, 22, respectively, conventional reversible swash plate pumps 30, 31 respectively connected in a closed loop with the motors 26, 27, respectively, an engine 32 for driving both of the pumps, flow rate and directional servo means 34, 35 for the pumps 30, 31, respectively, and control mechanism 36 for the servo means operated by a handle assembly 37 at the front of the vehicle.

The chassis is provided with means 38 at the rear of the vehicle for mounting apparatus (not shown) for securing the vehicle to be towed to the towing vehicle. Two embodiments of such apparatus are shown in co-pending application for United States Letters Patent, Serial No. 14,574, filed March 14, 1960.

The control mechanism 36, the handle assembly 37, and details thereof are illustrated in FIGS. 3a, 3b, 4a, 4b, 5 to 10, 18 and 19. The handle assembly 37 comprises a bracket 39 pivotally mounted at 40 for turning about a substantially vertical axis, an outer tubular handle 41, an inner shaft 42 extending through the handle 41 and connected through a 3-1 gear ratio element 42' to a handle member 43 at the outer end thereof for turning the same about its longitudinal axis (FIGS. 1 and 2), and a yoke 44 for supporting the handle 41 and the shaft 42 mounted for pivotal movement about a horizontal axis at 45 to enable the handle and shaft to be raised and lowered while operating the control mechanism.

The control mechanism 36 and the handle assembly 37 are so constructed and arranged, as will be described later in detail, that turning of the bracket 39 at its pivot 40 controls the turning or steering of the vehicle in both forward and reverse directions and that rotation of the shaft 42 about its longitudinal axis controls the speed of the vehicle. In order to utilize these motions to control a single articulating element for each servo means, which element extends from a remote location to operate the servo means simultaneously to change the speed and direction of the pumps, a mechanical mixer or lever system 46 is provided in the control mechanism 36.

As shown in FIGS. 3a, 4a, and schematically in FIGS. 12 to 17, the lever system 46 comprises a main lever 47 pivotally mounted at its midpoint 48 for turning about a vertical axis and having an arm 49 at one end for connecting the linkage under control of the speed control shaft 42, and a pair of levers 50, 51 each pivotally mounted adjacent opposite ends of the main lever 47. The inner ends of the levers 50, 51 have linkage connected thereto under the control of the bracket 39, as will be described hereinafter; and the outer ends of the levers have articulating or flexible push-pull elements 52, 53 respectively connected thereto, through spring-loaded over-ride mechanisms 54 (similar to that shown in FIG. 9) and bell cranks 55, which push-pull elements extend to the servo means 34 and 35, respectively (FIGS. 1, 3b and 4b).

The over-ride mechanism 54 normally provides a rigid link in the control system when pressure is available at the servo means 34, 35. However, when no pressure is available at the servo means, where they could not accept input signals, as in a case where the engine is not running, said servo means in order to avoid damage thereto are protected from an overload that may be imposed on the control system by an operator. This is accomplished by the operator's input signals collapsing or extending the spring loaded mechanism 54.

Another function of the over-ride mechanism 54 is to allow a turn signal to be imparted to the control system while operating at maximum speed (full pump volume). Normally a turn signal superimposed on a speed signal (see FIG. 17) results in an increase of output from one pump and a decrease of output from the other pump. However, in this case pump output cannot be increased, since it is at its maximum, with the result that the over-ride mechanism for this pump will absorb the increased signal; while the over-ride mechanism for the other pump will act as a rigid link and transmit the reduced turn signal thereto.

The linkage connecting the turn control bracket 39 and the levers 50, 51 is shown in FIGS. 3a, 4a and 10, and comprises a torque shaft 56 disposed in a horizontal plane at right angles to the axis 40 of the bracket 39, a lever 57 secured to the shaft 56 for turning movement therewith, a link 59 connected at one end to the lever 57 and at the other end to the bracket 39 at a point 60 spaced from its axis 40, a pair of levers 61, 62 secured to the shaft 56 for turning movement therewith, and links 64, 65, respectively connecting the levers 61, 62 to the levers 50, 51. This linkage converts turning movement of the bracket 39 to straight-in-line movement of the links 64, 65 to rock the levers 50, 51 simultaneously.

The linkage connecting the speed control shaft 42 to the main lever 47 is shown in FIGS. 3a, 4a, 5, 6, 7 and 8, and comprises a bell crank 66 pivotally mounted at 67 for turning about a horizontal axis and having arms 68 and 69 at its ends and an intermediate arm 70, a link 71 connecting the arm 69 to the arm 49 of the lever 47, and a system 72 of arms, links or levers, about to be described, for connecting the shaft 42 to the arm 70 in a manner to rock the bell crank 66 by means of the shaft 42 while the shaft 42 is in any raised or lowered position.

Figure 5:
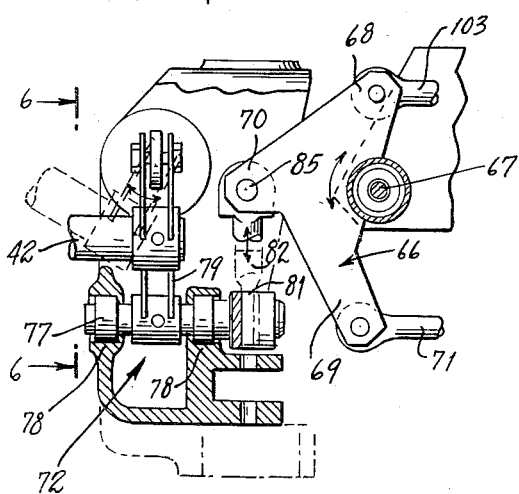
FIG. 5 is an enlarged view of a portion of the mechanism shown in FIG. 4a illustrating a speed and steering control.
Figure 6:
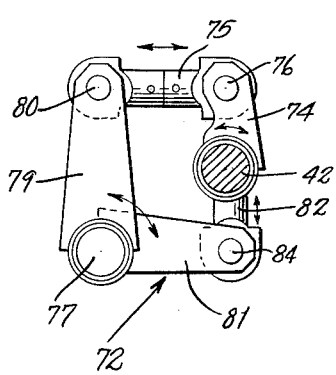
FIG. 6 is a sectional view taken along the line 6—6 on FIG. 5.
Figure 14:
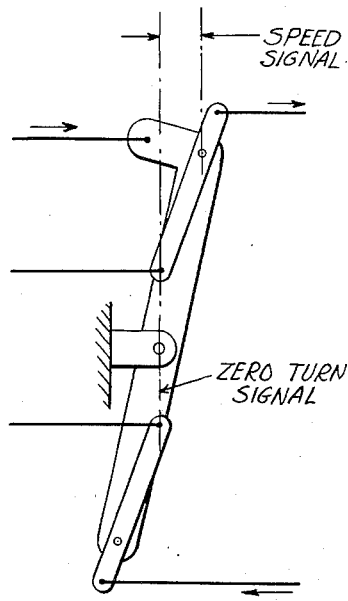

The system 72 is best shown in FIGS. 5 and 6, and comprises a first arm 74 mounted for rotation with the shaft 42, a link 75 having one end pivotally connected to the free end of the arm 74 at 76, a turnable shaft 77 journalled for rotation in bearings 78 (FIG. 5), a second arm 79 mounted on the shaft 77 adjacent one end thereof for rotation therewith and having its free end pivotally connected to the other end of the link 75 at 80, a third arm 81 mounted on the shaft 77 at one end for rotation therewith, and a second link 82, identical to link 75, pivotally connected at one end to the free end of the arm 81 at 84 and at its other end to the intermediate arm 70 of the bell crank 66 at 85. Thus, as indicated by the arrows in FIGS. 5 and 6, turning movement of the shaft 42 is converted to straight-in-line movement of the link 82 to rock the lever 66. It may be noted that the axis of link 75 lies along the axis 45 (pivotal axis of raising and lowering the handle 41) and that the axis of the link 82 lies along the axis 40 (pivotal axis of turning movement of the handle 41), so that the handle 41 may be raised or lowered and turned left or right independently of action of speed control shaft and thus without imparting a false signal to the speed control lever 66. This is accomplished by the swivel action of links 75 and 82, as will be described hereinafter.

As shown in FIGS. 7 and 8, the link 75, which is identical to link 82, of the system 72 is a swivel rod connection that comprises a lug member 86 connected to the first arm 74 at 76 and formed with a bore 87, a second lug member 89 connected to the second arm 79 at 80, a swivel member 90 extending into the bore 87 and secured therein by a pin 91 and being formed with a head 92, and a retainer sleeve 94 for rotatably and slidably receiving the head 92 secured to the lug member 89 by a pin 95.

In the event the operator leading the towing vehicle loses control of the handle assembly 37 for any reason whatsoever, provision is made to return the bracket 39 and the shaft 42 to a neutral position the moment the handle assembly is released. This is accomplished by a spring loaded device 96, shown in FIG. 9, one device 96 being provided in each of the speed control and turn control systems. This device 96 comprises a cylinder 97 having stops 98, 99 adjacent each end thereof with apertured annular discs 100, 101 urged against said stops by a spring 102, and a rod 103 extending through the discs 100, 101 and provided with spaced collars 104, 104' for engaging the respective discs. The collar 104 is adjustable in order to eliminate end play of the rod 103. Thus it can be readily seen that movement of the rod 103 in either direction will be resisted by the spring 102 and the rod will be thereby restored to its original position upon release of the activating force.

In FIGS. 3a and 4a, a device 96 is shown for the turn control system with the piston rod 103 pivotally connected to lever 57 on the torque shaft 56 and with its cylinder 97 pivotally mounted at 105 on the framework of the vehicle body; and another device 96 for the speed control system has its piston rod 103 pivotally connected through rod 103 to the arm 68 of the bell crank 66 at 106 and has its cylinder 97 pivotally connected to the framework of the body at 107.

Figure 11:
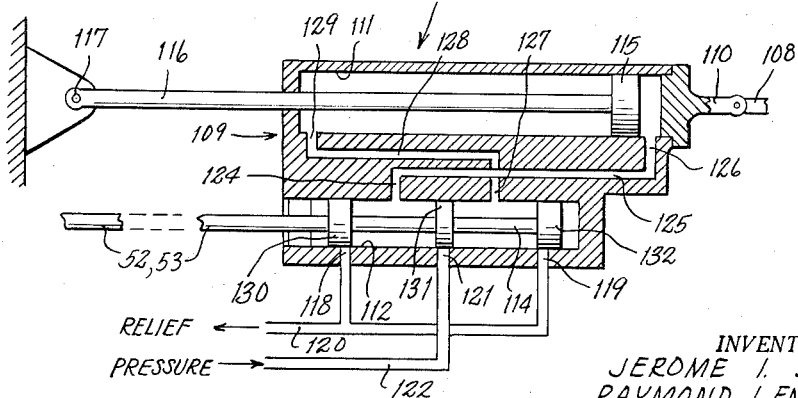
FIG. 11 is a diagrammatic sectional view of servo means for the pumps.

In FIG. 11, a conventional servo means 34 or 35 is schematically shown under the control of the flexible push-pull elements 52 or 53, through a linkage (to be explained hereinafter), which servo means is adapted to actuate the control rod 108 of the reversible swash plate pump 30 or 31. Each servo means comprises a body 109 connected by a lug 110 to the rod 108 and formed with an actuating cylinder 111 and a control cylinder 112, a shuttle valve member 114 in the control cylinder connected to a flexible push-pull element 52 or 53, and a piston 115 in the actuating cylinder 111 having a rod 116 pivotally connected to the framework of the vehicle at 117, so that the body 109 is free to move.

The control cylinder 112 has a port 118, 119 adjacent each end thereof, each port being connected to a common relief or return line 120 for the hydraulic fluid, and has an intermediate port 121 connected by a line 122 to the source of hydraulic servo-fluid under pressure. The control cylinder 112 further has a port 124 between the ports 118 and 121 connected by a passageway 125 to a port 126 at one end of the actuating cylinder 111 and has a port 127 between the ports 119 and 121 connected by a passageway 128 to a port 129 at the other end of the actuating cylinder.

The shuttle valve member 114 has three piston portions or heads 130, 131 and 132 adapted to close the ports 118, 121 and 119, respectively, when the servo means is in its neutral position, as shown in FIG. 11, whereby the actuating piston 115 is at rest.

When the shuttle valve member 114 is moved towards the right, as viewed in FIG. 11, for example, the ports 119 and 121 are opened briefly to establish communication between the ports 119 and 127 and between the ports 121 and 124, whereby fluid is admitted to the actuating cylinder 111 through the port 126 to move the body 109 and control rod 108 to the right. Since the body 109 moves to the right in response to the signal imposed by element 52 or 53 and since the element 52 or 53 and valve member 114 are at this instant stationary, such movement of the body 109 closes the just opened ports 119 and 121 and thereby places the servo means in a stationary position related to the input signal. Thus it is evident that successive movements of the valve member 114 produces almost imperceptible interrupted movements in the control rod 108 to correspondingly vary operation of the associated pump 30 or 31.

Similarly when the valve member 114 is moved towards the left, as viewed, the ports 118 and 121 are opened to establish communication between the ports 118 and 124 and between the ports 121 and 127, whereby fluid is admitted to the actuating cylinder 111 through the port 129 to move the body 109 to the left. The amount of movement imparted to the valve member 114 by the flexible shaft connected to the lever system 46 controls the degree port 121 is opened to operate the servo means, so that the control rod 108 sets the flow rate of the pump at a desired value.

The servo means 34, 35 are so connected to the lever system 46 that the swash plates of the pumps 30, 31 are driven in opposite directions when the flexible elements 52, 53 move in the same direction (FIGS. 15, 16), and that the swash plates are driven in the same direction at the same amounts when the flexible shafts move in opposite directions (FIGS. 13, 14) while driving the vehicle forward or in reverse. In actual practice, an operator when facing the vehicle and holding the handle member 43 (see FIG. 1) produces forward movement of the vehicle, that is, in a direction to the right, as viewed, by rotating the handle 43 on its axis clockwise which, in turn, rotates shaft 42 counter-clockwise in view of the reduction gear means 42'; while rearward or reverse movement is produced by rotating the handle 43 counter-clockwise.

Figure 17:
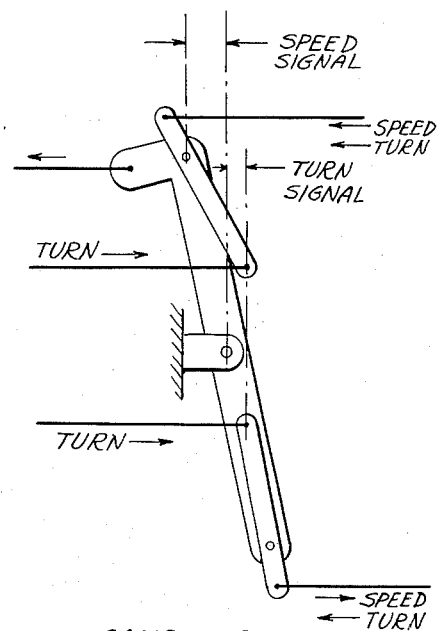
FIG. 17 is a diagrammatic view of the control mechanism in a composite forward speed and left turn steering control position.

Steering or turning of the vehicle is effected by operating the swash plates of the pumps to drive the wheels 21 and 22 in opposite directions. The speed at which the wheels are driven in opposite directions controls the rate of turn the vehicle makes. FIG. 17 shows the composite signal that occurs when both a speed signal and a turn signal are imparted to the control system simultaneously.

In FIGS. 3b, 4b, 18 and 19 are shown the linkage interconnecting the servo means 34, 35 and the flexible elements 52, 53 respectively. This linkage comprises a termination 134 for the outer sheath of the flexible element 52, the inner coaxial slider 135 of element 52 being extended and being pivotally connected to one arm of bell crank 136 at 137, bell crank 136 being loosely secured to a freely rotatable torque shaft 138. To the other arm 139 of bell crank 136 one end of a link 140 is connected, while the other end of the link 140 is pivotally connected to a free end of an arm 141 rigidly secured at its other end to a freely rotatable torque shaft 142. A pair of spaced arms 143, also rigidly secured to opposite ends of shaft 142, have their free ends pivotally connected at 144 to associated links 145 which in turn at their remote ends 146 are connected to the servo means 34 of pump 30.

With respect to flexible element 53, the outer sheath thereof is terminated at 147 and its inner coaxial slider 148 is extended and pivotally connected to one end of a walking beam 149 which is rigidly connected at its center to one end of the torque shaft 138, which shaft in turn is free to pivot on its own axis. Adjacent the other end of the torque shaft 138 is rigidly connected one end of an arm 151. The free ends of both the walking beam 149 and the arm 151 are pivotally connected to associated links 152 which latter at their remote ends 153 are connected to the servo means 35.

In order to insure a positive neutral position for each of the servo means 34, 35 and thereby eliminate inherent lost motion of the linkage system, a centering cam 154 having a recess 155 is rigidly secured to each of the servo means and a spring loaded follower 156 having suitable adjusting means 157 mounted on a bracket 158 is adapted to register with the recess 155 of the cam 154.

In FIG. 20 a flow diagram of a hydraulic system for the first embodiment of said co-pending application is shown wherein fixed displacement reversible hydraulic motors 26, 27 are connected in a closed loop L with variable displacement reversible pumps 30, 31 controlled by servo means 34, 35, respectively, so that the motors will instantaneously react through a fluid column to any flow output of the pumps. The rotational speeds of the motors which drive the vehicle wheels are in direct relationship with the rate of flow output of the pumps. The flow regulation of the pumps is controlled in the manner already described.

The system shown includes pumps 160, 161 for operating auxiliary or accessory equipment, such as a winch 162 and cylinders 163, for operating the apparatus for attaching the vehicle to be towed to the towing vehicle and for supplying servo-fluid to the servo means 34, 35. Suitable manual controls 164 and 165 are provided for the winch 162 and the cylinders 163.

In FIG. 21 there is shown a flow diagram of a hydraulic system for the second embodiment of said co-pending application, wherein hydraulic motors 26, 27 are again connected in a closed loop L with the pumps 30, 31 controlled by the servo means 34, 35, respectively, as in the first embodiment of said co-pending application. In this second embodiment the auxiliary system and supply of hydraulic fluid to the servo means 34, 35 are somewhat different, as will appear hereinafter.

Fluid is drawn from reservoir R into dual pumps 166, 167. Pump 167 supplies fluid to manual control valve 168 which, in turn, directs fluid to piston motor 169, which functions to raise and lower the nose wheel pick up arms of this second embodiment. Maximum pressure in this system is controlled by relief valve 170. It should be noted that with valve 168 in its neutral position as shown, the fluid in motor 169 (to the right of the piston) is blocked which results in the lifting arms being locked for supporting an aircraft nose wheel off the deck. Also, with valve 168 in this position, fluid from pump 167 is directed through the open center of the valve into a supercharging and replenishing system for the main loops L at point A. Any fluid over and above that required to compensate for internal leakage in the loops L is automatically directed through a filter 171 and the cases of the pumps 30, 31, and thence back into the reservoir R. This continuous flow of fluid through the cases of the pumps 30, 31 provides such cooling as is required for this system.

The second pump 166 supplies hydraulic fluid to piston motors 172, 173, such fluid being controlled by solenoid valves 174, 175. These motors control lateral movement of the nose wheel arms to accommodate various nose wheel axle widths. When pistons 176, 177 of the respective motors 172, 173 are retracted, the pick up arms are urged towards one another until the pins at the extremities thereof enter the apertures of the nose wheel axle. Maximum pressure of this system is controlled by a relief valve 176'. With solenoid valves 174, 175 in their center positions as shown, pistons 176, 177 are locked against movement, since the ports which would allow this action are blocked at the valves 174, 175. Accordingly, the pins at the extremities of the pick up arms are prevented from moving out of engagement with the nose wheel apertures. Appropriate electrical switches located on the vehicle control the configuration of the valves 174, 175 through their respective solenoids to extend or retract pistons 176, 177, as may be desired. It may be noted that a pressure switch 178 is provided in order to sense the pressure in the fluid line between cylinder 169 and valve 168, so that whenever there is pressure in cylinder 169 because of the weight of the lifted aircraft nose wheel, the pressure switch automatically de-energizes appropriate solenoids on valves 174, 175 to insure that pick up pins at the extremities of the lifting arms cannot be inadvertently withdrawn from the nose wheel axle apertures.

When the valves 174, 175 are in their neutral position as shown, fluid emanating from pump 166 is directed through the open centers of the valves to join the fluid from pump 167 at point B or, if unacceptable at this point, to flow through the filter 171 and back to the reservoir R through the cases of pumps 30, 31.

Another difference between the first embodiment and this second one of said co-pending application lies in the method of supplying pressure to the pump servo means 34, 35. In the first embodiment, servo pressure was supplied directly from pump 160 (FIG. 20) which corresponds to pump 166 of this second embodiment. In this second embodiment, however, servo supply is provided directly by the main loops L at point C, so that the minimum servo pressure would be the supercharge pressure (70 p.s.i.) when the driving loops L are not providing propelling energy. When the driving loops are pressurized, as in the case of towing an aircraft, this pressure would be felt by the servos 34, 35, so that as the servo output load requirements go up with towing load, available pressure to operate said servo means also increases. Needle valves 179, 180 have been introduced into the system to make adjustable the available flow to the servo means 34, 35 for the purpose of controlling the rate of response of said servo means.

From the foregoing description, it will be seen that the present invention provides an improved system for towing vehicles and the like, which makes the vehicle highly maneuverable and safe because it stops the vehicle instantly in the event the operator releases the controls thereof.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a towing vehicle, the combination of left and right driving wheels adjacent one end of the vehicle, a caster adjacent the other end of the vehicle, a rotary hydraulic motor for each of said driving wheels, a reversible pump for each of said motors each connected in a closed loop with one of said motors for supplying hydraulic fluid under pressure to said motors, an engine for driving said pumps, servo means for each of said pumps for reversing the flow of fluid in the loops to thereby reverse said motors and for controlling the rate of flow of the fluid delivered to said motors, and manually operable control mechanism for operating said servo means including speed control means for simultaneously varying the amount of fluid delivered to both of said motors in either direction to maintain the speed of said motors equal and including turn control means for simultaneously causing the fluid to flow in the loops to differentially drive said motors and thereby effect turning of the vehicle, said control mechanism including a bracket mounted on said vehicle to turn about a substantially vertical axis, a tubular handle for turning said bracket, linkage interconnecting said bracket and turn control means for operating said turn control means upon turning of said bracket, a shaft having a handle member thereon mounted in said tubular handle to turn about its axis, and linkage interconnecting said shaft and speed control means for operating said speed control means upon turning of said shaft.

2. In a towing vehicle according to claim 1, wherein said linkages include a pivotally mounted main lever, means for converting turning movement to straight-in-line movement connected between said shaft and said main lever to rock said main lever, a pair of levers mounted on said main lever each having means at one end thereof for controlling said servo means, and means for converting turning movement of said bracket to straight-in-line movement connected between said bracket and the other end of each of said pair of levers for simultaneously rocking the same with respect to said main lever.

3. In a towing vehicle according to claim 2, wherein said means on said pair of levers for controlling said valve means each includes an over-ride spring loaded connection.

4. In a towing vehicle according to claim 2, wherein said second mentioned movement converting means includes a torque shaft having its axis in a horizontal plane at right angles to the pivotal axis of said bracket, a lever secured to said torque shaft for turning the same, means pivotally connecting said last mentioned lever to said bracket to effect turning of said torque shaft upon turning of said bracket, a pair of levers mounted on said torque shaft for rotation therewith, and a link for pivotally connecting each of said last mentioned pair of levers to one of said levers mounted on said main lever.

5. In a towing vehicle according to claim 4, wherein means for returning said turn control means to a neutral position are connected to one of said levers on said torque shaft.

6. In a towing vehicle according to claim 2, wherein said first mentioned movement converting means includes a first arm mounted for rotation with said shaft, a first link having one end pivotally connected to the free end of said first arm, a turnable shaft, a second arm mounted on said turnable shaft for rotation therewith and having its free end pivotally connected to the other end of said first link, a third arm mounted on said turnable shaft for rotation therewith, a pivotally mounted bell crank disposed at right angles to said turnable shaft, a second link pivotally connected to the free end of said third arm and between the ends of said bell crank to one side of its pivot point, and a lever pivotally connected to one arm of said bell crank and to one end of said main lever.

7. In a towing vehicle according to claim 6, wherein said first and second links are constituted as swivel rod connections.

8. In a towing vehicle according to claim 6, wherein means for returning said speed control shaft to a neutral position are connected to the other arm of said bell crank.

9. In a towing vehicle according to claim 6, wherein said bracket includes a yoke for said tubular handle and said inner shaft mounted for pivotal movement about a horizontal axis and said first link includes a pair of members interconnected for slidable and rotatable movement to provide a swivel.

10. A control mechanism for a reversible servo means, said mechanism comprising a bracket mounted to turn about a substantially vertical axis, a tubular handle for turning said bracket, a shaft having a handle member thereon mounted in said tubular handle to turn about its axis, a pivotally mounted main lever, means for converting turning movement to straight-in-line movement connected between said shaft and said main lever to rock said main lever, a pair of levers mounted on said main lever each having means at one end for controlling the servo means, and means for converting turning movement of said bracket to straight-in-line movement connected between said bracket and the other end of each pair of levers for simultaneously rocking the same with respect to said main lever.

11. In a control mechanism according to claim 10, wherein said means on said pair of levers for controlling said servo means each includes an over-ride connection.

12. In a control mechanism according to claim 10, wherein said second movement converting means includes a torque shaft, a lever secured to said torque shaft, means pivotally connecting the last mentioned lever to said bracket to effect turning of said torque shaft, a pair of levers mounted on said torque shaft for rotation therewith, and a link for pivotally connecting each of said last mentioned pair of levers to one of said levers mounted on said main lever.

13. In control mechanism according to claim 12, wherein said means for returning said turn control means to a neutral position are connected to one end of said lever on said torque shaft.

14. In a control mechanism according to claim 10, wherein said first mentioned movement converting means includes a first arm mounted for rotation with said shaft, a first link having one end pivotally connected at one end to the free end of said first arm, a turnable shaft, a second arm mounted on said turnable shaft for rotation therewith and having its free end pivotally connected to the other end of said first link, a third arm mounted on said turnable shaft for rotation therewith, a pivotally mounted bell crank disposed at right angles to said turnable shaft, a second link pivotally connected to the free end of said third arm and between the ends of said bell crank to one side of its pivot point, and a lever pivotally connected to one arm of said bell crank and to one end of said main lever.

15. In a control mechanism according to claim 14, wherein said first and second links are constituted as swivel rod connections.

16. In a control mechanism according to claim 14, wherein said first mentioned shaft is returned to a neutral position upon release of the handle member thereon by means connected to the other arm of said bell crank.

17. In a control mechanism according to claim 14, wherein said bracket includes a yoke for said tubular handle and said inner shaft mounted for pivotal movement about a horizontal axis and said first link includes a pair of members interconnected for slidable and rotatable movement to provide a swivel.

18. Control mechanism for a towing vehicle comprising a shaft mounted at one end for pivotal movement and rotation about its longitudinal axis and having manually engageable means at the free end thereof to effect said movement thereof, a first arm mounted on said shaft for rotation therewith, a first link having one end pivotally connected to the free end of said first arm, a turnable shaft, a second arm mounted on said turnable shaft for rotation therewith and having its free end pivotally connected to the other end of said first link, a third arm mounted on said turnable shaft for rotation therewith, and a second link pivotally connected to the free end of said third arm, whereby rotation of said first mentioned shaft is converted to straight-in-line movement of said link, said first and second links including a pair of interconnected elements rotatable and slidable with respect to each other to provide a swivel connection.

19. In a power plant for a towing vehicle, the combination of a pair of rotary hydraulic motors; a reversible pump for each of said motors each connected in a closed loop with one of said motors for supplying hydraulic fluid under pressure to said motors; an engine for driving said pumps; servo means for each of said pumps for reversing the flow of fluid in the loops to thereby reverse said motors, and for controlling the rate of flow of the fluid delivered to said motors; and control mechanism for said servo means including a pair of slidable elements, a rotatable shaft, a bell crank secured to said shaft for movement therewith having a pair of arms one of which has one of said slidable elements pivotally connected thereto, linkage connecting the other arm of said bell crank to one of said servo means, a walking beam secured at its center to said shaft for movement therewith and having one end pivotally connected to the other of said slidable elements, and linkage connecting the other end of said beam to the other of said servo means.

20. A power plant according to claim 19, wherein servo means and said linkages therefor include a centering cam secured to each of said servo means having a recess, and a spring loaded follower for each cam adapted to register with said cam recess to thereby eliminate lost motion of said linkages.

21. A power plant according to claim 20, wherein said follower includes means for adjustably mounting the same.

22. In a power plant according to claim 19, wherein said control mechanism includes means for providing linear movement, and a flexible cable arranged in a sheath for push-pull movement is connected at one end to each of said slidable elements and at the other end to said last mentioned means.

23. In a power plant according to claim 22, wherein said last mentioned means include mechanism for converting rotary movement to linear movement.

References Cited in the file of this patent

UNITED STATES PATENTS

| | | |
|---|---|---|
| Re. 15,243 | Manly | Dec. 6, 1921 |
| 2,313,768 | Putt | Mar. 16, 1943 |
| 2,446,242 | Orshansky | Aug. 3, 1948 |
| 2,751,990 | Finlay et al. | June 26, 1956 |
| 2,892,505 | Goodwin | June 30, 1959 |
| 2,941,609 | Bowers et al. | June 21, 1960 |

FOREIGN PATENTS

| | | |
|---|---|---|
| 807,550 | Great Britain | Jan. 14, 1959 |